(12) United States Patent
Derive et al.

(10) Patent No.: US 6,287,366 B1
(45) Date of Patent: Sep. 11, 2001

(54) PROCESS FOR THE PRODUCTION OF OXYGEN BY ADSORPTION WITH TRANSATMOSPHERIC PRESSURE VARIATION

(75) Inventors: Nathalie Derive, Paris; Anne Dubois, Le Chesnay; Christian Monereau, Paris, all of (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/287,624

(22) Filed: Apr. 7, 1999

(30) Foreign Application Priority Data

Apr. 7, 1998 (FR) .................................................. 98 04303

(51) Int. Cl.⁷ .................................................. B01D 53/47
(52) U.S. Cl. .............................. 95/100; 95/103; 95/105; 95/130
(58) Field of Search ........................ 95/96–98, 100–105, 95/130–138

(56) References Cited

U.S. PATENT DOCUMENTS

| | | | |
|---|---|---|---|
| 3,280,536 | * 10/1966 | Berlin | 95/130 X |
| 3,313,091 | * 4/1967 | Berlin | 95/130 X |
| 3,564,816 | * 2/1971 | Batta | 95/130 X |
| 3,636,679 | * 1/1972 | Batta | 95/130 X |
| 3,717,974 | * 2/1973 | Batta | 95/130 X |
| 3,738,087 | * 6/1973 | McCombs | 95/130 X |
| 3,973,931 | * 8/1976 | Collins | 95/130 X |
| 4,160,651 | * 7/1979 | Pivard | 95/130 X |
| 4,781,735 | * 11/1988 | Tagawa et al. | 95/101 |
| 4,810,265 | * 3/1989 | Lagree et al. | 95/130 X |
| 4,917,710 | * 4/1990 | Haruna et al. | 95/130 X |
| 4,969,935 | * 11/1990 | Hay | 95/130 X |
| 4,981,499 | * 1/1991 | Hay et al. | 95/130 X |
| 5,122,164 | * 6/1992 | Hirooka et al. | 95/130 X |
| 5,330,561 | * 7/1994 | Kumar et al. | 95/130 X |
| 5,407,465 | * 4/1995 | Schaub et al. | 95/130 X |
| 5,429,666 | * 7/1995 | Agrawal et al. | 95/130 X |
| 5,518,526 | * 5/1996 | Baksh et al. | 95/101 X |
| 5,520,720 | * 5/1996 | Lemcoff | 95/130 X |
| 5,529,607 | * 6/1996 | Tan | 95/130 X |
| 5,536,299 | * 7/1996 | Girard et al. | 95/130 X |
| 5,540,758 | * 7/1996 | Agrawal et al. | 95/130 X |
| 5,565,018 | 10/1996 | Baksh et al. | 95/100 |
| 5,702,504 | * 12/1997 | Schaub et al. | 95/130 X |
| 5,733,359 | * 3/1998 | Doong et al. | 95/130 X |
| 5,755,856 | * 5/1998 | Miyake et al. | 95/130 X |
| 5,997,612 | * 12/1999 | Doong | 95/101 |

FOREIGN PATENT DOCUMENTS 0 449 448   10/1991  (EP) .

\* cited by examiner

Primary Examiner—Robert H. Spitzer
(74) Attorney, Agent, or Firm—Young & Thompson

(57) ABSTRACT

A repressurization phase of an adsorber comprises a step of first countercurrent repressurization with at least gas from a first co-current decompression of another adsorber, this phase ending in a step of co-current production. Immediately following the first countercurrent repressurization step, air is introduced co-current into the adsorber.

15 Claims, 2 Drawing Sheets

PROCESS FOR THE PRODUCTION OF OXYGEN BY ADSORPTION WITH TRANSATMOSPHERIC PRESSURE VARIATION

CROSS REFERENCE TO RELATED APPLICATION

This application corresponds to French application 98 04303 filed Apr. 7, 1998, the disclosure of which is incorporated herein by reference.

FIELD OF THE INVENTION

The present invention relates to a process for the production of oxygen from air by adsorption with transatmospheric pressure variation, of the type in which, by means of a unit comprising at least two adsorbers, there is carried out in each adsorber a cycle comprising, successively and cyclically:

a phase (a) of repressurization to the high pressure of the cycle, this phase comprising a step (a1) of first repressurization countercurrent with at least one gas from a first decompression countercurrent in another adsorber, this phase (a) terminating in a step (a4) of production with admission of air countercurrent in which the oxygen produced is removed from the adsorber; and a phase of regeneration comprising:
 a step (b) of first decompression countercurrent in which the gas from the adsorber is sent to another adsorber in the course of step (a1);
 a step (c) of countercurrent purge comprising pumping to the low pressure (Pm) of the cycle; and
 a step (d) of purge/elution in which production gas is introduced countercurrent into the adsorber, which is subjected simultaneously to countercurrent pumping. cl BACKGROUND OF THE INVENTION The PSA (pressure swing adsorption) processes are more and more widely used to produce oxygen of limited purity from atmospheric air. Of course, it is a continuous aim to reduce the cost of the oxygen produced.

To do this, there can be used adsorbents that are particularly specific and effective for the $O_2/N_2$ separation, such as zeolites exchanged with lithium. However, the cost of these adsorbents is very much higher than that of conventional adsorbents such as molecular sieves 5A or 13X, such that their acceptance presupposes that only a small quantity of adsor-bents will be necessary.

To minimize the volumes of adsorbents used, it has been proposed to shorten the cycle, in particular by overlap ping the steps that are conventionally sequential.

The air can thus be introduced into the adsorber as soon as possible after the end of the purge/elution step, even immediately following the latter.

However, all things being equal, this introduction of air at low pressure has a negative influence on the advance of the adsorption fronts, which progress faster as the pressure in the adsorbent is low.

This is true for removing nitrogen but also for removing atmospheric impurities (water, $CO_2$, traces of hydrocarbons, . . . ), for which there is used either a specific bed such as a bed of alumina or silica gel, or an adsorbent serving for the separation of $O_2/N_2$. In all these cases, the introduction of air at low pressure requires in effect greater volumes of adsorbents, which is contrary to the stated object.

On the other hand, the growth of the region in which takes place removal of the impurities increases the volume of air uselessly compressed and then pumped, to the detriment of the specific energy.

To limit these drawbacks, there has been proposed (EP-A-449 448) a process of the type mentioned above in which, in a unit with two adsorbers, the step (a1) mentioned is carried out only by introduction countercurrent of gas from the first countercurrent decompression of the other adsorber, and is followed by a second partial repressurization countercurrent step solely with production gas. After this second step, the air is introduced co-current into the adsorber to carry out the production step, in the course of which the production gas (oxygen) is sent to a storage.

SUMMARY OF THE INVENTION

The invention has for its object to permit obtaining, under satisfactory operating conditions, a cycle of further reduced duration.

To this end, the invention has for its object a process of the type mentioned above, characterized in that, in the course of a final step of phase (a), the air is introduced co-current into the adsorber immediately following the step (a1) of first countercurrent repressurization.

The process according to the invention can comprise one or several of the following characteristics, taken alone or in all technically possible combinations:

production gas is also introduced countercurrent into the adsorber during the step (a1) of first countercurrent repressurization;
 the two gases introduced counter-current during step (a1) are introduced simultaneously and during all the duration of this step (a1);
 during all said final step of phase (a), production gas is withdrawn from the adsorber and is sent to at least one storage;
 during an initial portion of said final step of phase (a), the production outlet of the adsorber is closed, whilst this outlet is open following this final step;
 in the course of step (b), there is carried out the counter-current depressurization first by venting the adsorber to the air, to substantially atmospheric pressure, then by countercurrent pumping.
 the duration of the cycle does not exceed 120 seconds, typically it does not exceed 80 seconds.

BRIEF DESCRIPTION OF THE INVENTION

Examples of embodiment of the invention will now be described with respect to the accompanying drawings, in which.

DETAILED DESCRIPTION OF THE INVENTION

Figure 1:
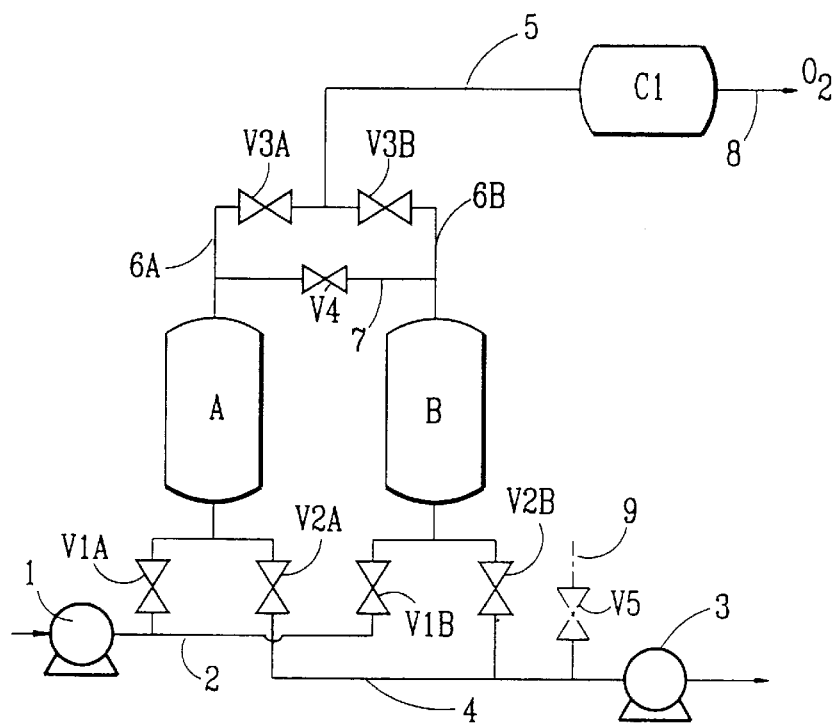
FIG. 1 shows schematically an oxygen production unit adapted to practice a process according to the invention.

The unit shown in FIG. 1 is adapted to produce oxygen of limited purity, typically 85 to 95%, from atmospheric air by atmospheric PSA adsorption.

This unit comprises: an air compressor 1; two adsorbers A and B; an air supply line 2 for the adsorbers, which connects the discharge of the compressor to the lower ends or inputs of the adsorbers via respective valves V1A and V1B; a vacuum pump 3 whose output is connected to the ambient atmosphere; an evacuation line 4 which connects the intake of the vacuum pump to the intakes of the adsorbers via respective valves V2A and V2B; and a line 5 for circulation of oxygen connected to the upper end or outlet of each adsorber by respective connections 6A and 6B provided with respective valves V3A and V3B for adjusting the flow rate. These outputs of the two adsorbers are moreover interconnected by a pressure balancing conduit 7 provided with a valve V4 for adjustment of flow rate.

The line 5 empties downstream into a storage C1 from which extends a production conduit 8.

Figure 2:
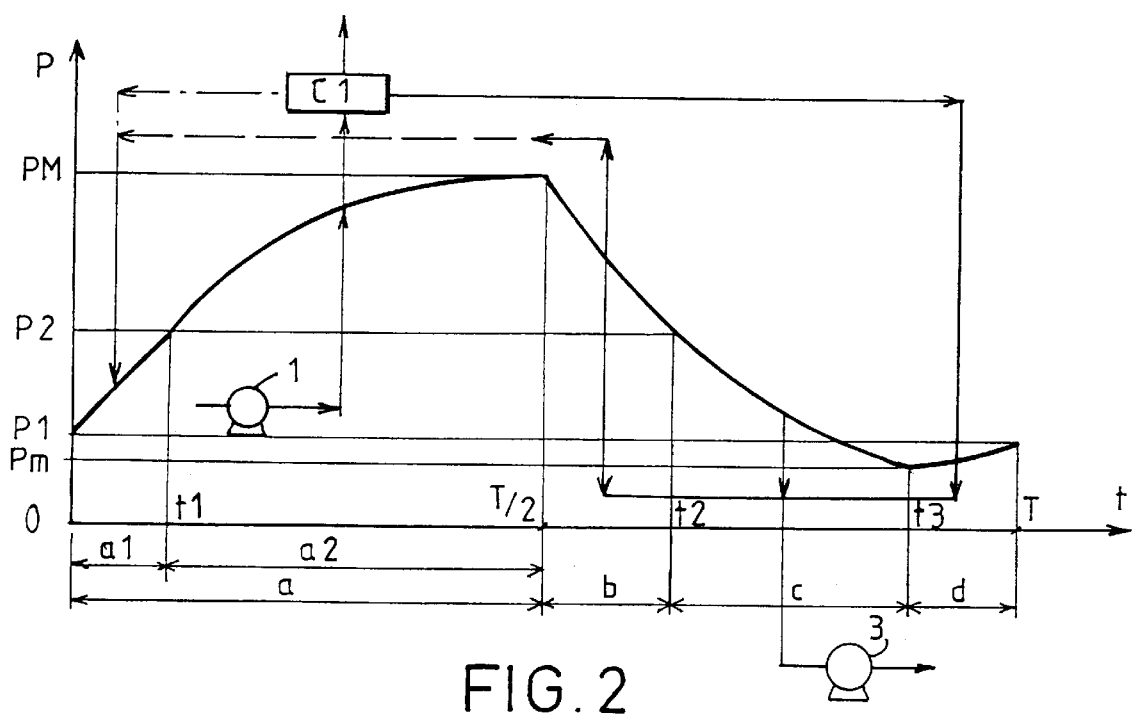
FIG. 2 is a diagram illustrating a cycle according to the invention but practiced with the unit of FIG. 1.

The unit moreover comprises means, known per se and not shown, for control, regulation and electrical supply, suitable to carry out the cycle shown in FIG. 2.

In FIG. 2, in which the times t are on the abscissa and the absolute pressures P on the ordinates, the lines bearing arrows indicate the movements and destinations of the gaseous currents and, moreover, the direction of circulation in the adsorber.

The cycle of FIG. 2, whose duration does riot exceed 120 seconds, comprises the following successive steps. These steps are described for one of the adsorbers, for example adsorber A. The adsorber B undergoes the same steps, with a temporal offset of T/2, where T designates the duration of the cycle.

(a) From t–0 to T/2, a repressurization phase constituted by the following steps:
(a1) The valves V1A, V2A and V3A being closed, the valve V4 is open. The adsorber then experiences, from t=0 to t1, a first countercurrent repressurization from pressure P1 at the end of purge/elution, slightly greater than the low pressure Pm of the cycle, to an intermediate pressure P2. This first pressurization is carried out solely counter-current with oxygen from the other adsorber flowing as the repressurization phase.
(a2) At time t1, valve V4 is closed and valve V1A is open. Air is thus introduced into the adsorber and circulates in the latter co-current. The production gas from the adsorber is sent to the storage C1. In the course of this final co-current recompression step, the pressure of the adsorber rises from the pressure P2, to the high pressure PM of the cycle.

The adsorber is then regenerated from T/2 to T, by means of the following steps.
(b) From T/2 to t2, a first decompression phase, both co-current and countercurrent, in which:
On the one hand, the outlet of the adsorber is placed in communication with that of the other adsorber. To do this, the valves V1A and V3A are closed, and the valve V4 is open.
On the other hand, simultaneously, the inlet of the adsorber is connected to the suction of the vacuum pump 3 by opening the valve V2A.
This step (b) ends when the pressures of the two adsorbers are balanced and equal to the pressure P2 mentioned above.
(c) From t2 to t3, a step of countercurrent depressurieation by pumping by means of the pump 3, to reach the low pressure Pm of the cycle. To do that, valve V4 is closed at time t2.
(d) From t3 to T, the valve V3A is also open, and there is thus produced a purge/elution step in the course of which the adsorber receives the gas countercurrent, from the storage C1, and is simultaneously evacuated countercurrent by pumping by means of the pump 3. In the course of this phase, the pressure rises slightly from Pm to P1.

As a modification, according to the required elution flow rate, this flow rate can be withdrawn directly at the output of the other adsorber in the production step (a2). The flow rate is then adjusted by means of the valve V4.

The introduction of air, in the course of phase (a), immediately following the first recompression (a1), permits obtaining a particularly short cycle. The shortening of the duration of the concomitant steps (a1) and (b) is limited by the fact that if the first co-current depressurization, in the course of step (b), is too rapid, the gas from the adsorber during this depressurization is in danger of becoming enriched in nitrogen. This duration will therefore be selected as a function of the geometry of the adsorbers and of the nature of the adsorbent particles.

By way of example, in the cycle of FIG. 2, the pressure and times can be as follows:

| Step/phase | Final pressure (bar) | Duration |
| --- | --- | --- |
| (a1) | P2 = 0.7 to 1.0 | 2 to 7 |
| (a2) | PM = 1.3 to 1.6 | 13 to 33 |
| (b) | P2 = 0.9 to 1.3 | 2 to 7 |
| (c) | Pm = 0.3 to 0.5 | 8 to 20 |
| (d) | P1 = 0.3 to 0.5 | 5 to 13 |

Total duration of the cycle: T = 30 to 80 s

To prevent shortening the duration of steps (a1) and (b), there can, as a variant, as shown in broken line in FIG. 2, be introduced simultaneously in the adsorber, countercurrent, oxygen removed from the storage C1, in the course of the step (a1) and preferably during all this step (a1). One could thus, as a counterpart, decrease the quantity of oxygen withdrawn countercurrent and correspondingly reduce the duration of this step (b)—hence the duration of the cycle—without interfering with the kinetic order. By way of example, these phases, and hence the cycle, can thus be shortened by 5 to 10 seconds.

The pressure cycle thus described can comprise a certain number of modifications which do not change the characteristics of the invention but which permit better adapting the unit to the characteristics of retained machines or to the local economic conditions:

As seen by broken lines in FIG. 1, the unit can comprise a conduit 9 for venting to the air, provided with a valve V5 and connected to the line 4, just upstream of the pump 3. In this case, the countercurrent depressurization of the adsorber can take place to the atmospheric pressure by venting to the air, by opening the valve V5, then by pumping to the low pressure Pm.

The outlet of the adsorber can be closed during an initial portion of step (a2), so as to obtain a more rapid pressure increase in the adsorber.

The pressure at the end of purge-elution P1 can be essentially equal to the low pressure Pm of the cycle, and can even be lower than the pressure at the end of step (c).

Balancing the pressures between adsorbers during concomitant steps (a1) and (b1) need only be partial, which is expressed by the different ranges of values for pressure P2 in the above table.

Figure 3:
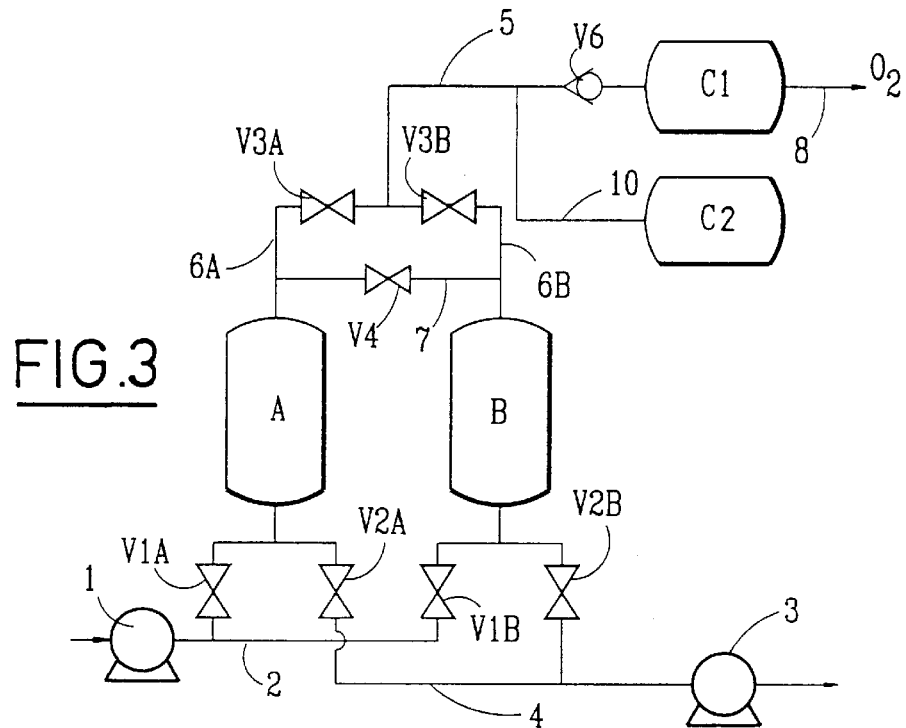
FIG. 3 shows schematically a modification of the unit of FIG. 1.

In the example of FIG. 3, a conduit 10 is connected to the conduit 5 and opens into an auxiliary storage C2 having no other outlet. An anti-return valve V6 is mounted between the connection and the storage Cl, and lets gas pass only toward this latter.

Then the valve V6 opens when, and only when, the pressure of the storage C2 is greater than that of the storage C1.

Figure 4:
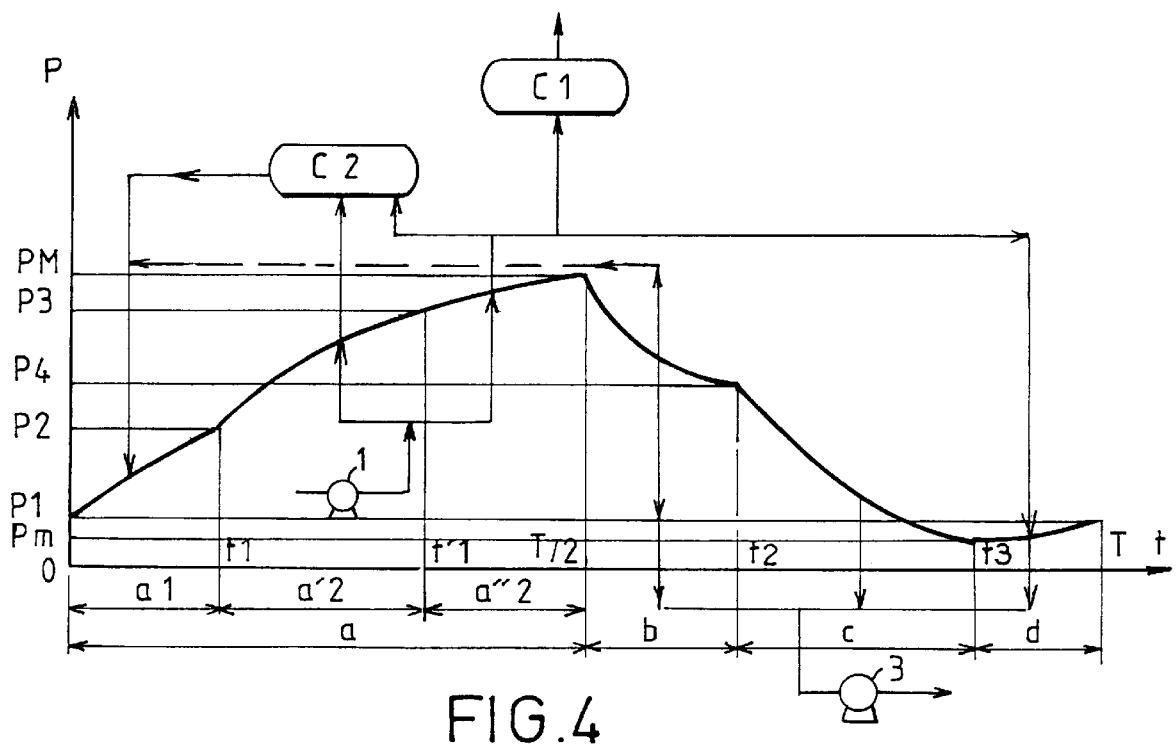
FIG. 4 is a diagram analogous of FIG. 2, illustrating a cycle according to the invention but employing the unit of FIG. 3.

The corresponding cycle, shown in FIG. 4, is attained with the same manipulations of the valves as above. However, because of the presence of the storage C2 and the valve V6, the cycle differs from the previous embodiment of the cycle of FIG. 2 by the following points:

Phase (a):
At the time t=0, the valves V3A and V4 are open. Then in the course of step (a1), the adsorber receives countercurrent a) on the one hand the gas from the other adsorber in step b), on the other hand oxygen from the storage C2. Thus, upon opening the valve V3A, the pressure of the storage C2 becomes slower than that of the storage C1, which gives rise to closing of the valve V6.

Step (a2)
Step (a2) of final repressurization is subdivided into two substeps (a'2) and (a"2):
(a'2): At time t1, the valve V4 is closed and the valve V1A is open. The assembly of adsorber+storage C2 is thus repressurized to an intermediate pressure P3, which is the pressure of the storage C1 at time t'1.
(a"2): From the time t'1, the valve V6 opens, and it is the assembly of adsorber+storage C1+storage C2 which rises in pressure to the high pressure PM.

The second half of the cycle, from T/2 to T, is identical to that described above as to FIG. 2. However, in the described example, at time t2, the pressure of the adsorber is P4>P2, which means that the balancing of the pressures between the two adsorbers has been only partially carried out.

The embodiment of FIGS. 3 and 4 permits better controlling the speed of pressure increase of the adsorber in the of the repressurization phase (a).

What is claimed is:

1. A process for the production of oxygen from air by adsorption, in at least one unit comprising two adsorbers, where there is carried out in each adsorber a cycle comprising the following successive steps:
   a1) countercurrent repressurization to an intermediate pressure with at least one gas coming directly from the other adsorber subject to a first co-current depressurization;
   a2) co-current repressurization by air, terminating by a sub-step of production at an upper pressure of the cycle during which product gas is withdrawn from the adsorber and sent to a non-segregated product gas capacity;
   b) a first co-current decompression step with simultaneous counter-current and co-current withdrawal of gas from the adsorber, the gas withdrawn co-currently being sent directly to the other adsorber in the course of step a1);
   c) a countercurrent purge step to a low pressure of the cycle; and
   d) a purge/elution step in which production gas is introduced countercurrently into the adsorber which is subjected simultaneously to countercurrent evacuation.

2. The process of claim 1, wherein during step b) countercurrent gas withdrawal is achieved by pumping.

3. The process of claim 1, wherein during step a1) product gas is also introduced countercurrently into the adsorber.

4. The process of claim 3, wherein during step a1) the two gases are introduced simultaneously during all the duration of step a1).

5. The process of claim 3, wherein during an initial portion of the production sub-step, the product gas is sent to an auxiliary tank.

6. The process of claim 1, wherein during all the production sub-step, product gas is sent to at least one tank (C1; C1, C2).

7. The process of claim 1, wherein during step b) the gas withdrawn countercurrently is vented to the atmosphere.

8. A process for the production of oxygen product from air by adsorption with transatmospheric pressure variation, in at least one unit comprising two adsorbers, where there is carried out in each adsorber a cycle comprising, successively and cyclically:
   a repressurization phase to a high pressure of the cycle, comprising the following successive steps:
   a1) repressurization with countercurrent introduction of gas from the other adsorber subject to depressurization and of oxygen product;
   a2) co-current repressurization by air, terminating by a sub-step of production during which product gas is withdrawn from the adsorber and sent to at least one non-segregated product gas capacity; and
   an immediately subsequent regeneration phase comprising the following successive steps:
   b) a first co-current decompression step with simultaneous counter-current and co-current withdrawal of gas from the adsorber, the gas withdrawn co-currently being sent directly to the other adsorber in the course of step a1);
   c) a countercurrent purge step to a low pressure of the cycle; and
   d) a purge/elution step with countercurrent introduction of oxygen product.

9. Process according to claim 8, wherein the duration of the cycle does not exceed 120 seconds.

10. Process according to claim 9, wherein the duration of the cycle does not exceed 80 seconds.

11. The process of claim 8, wherein during step a1) the two gases are introduced simultaneously during all the duration of step a1).

12. The process of claim 8, wherein during all the production sub-step, the oxygen product is sent to at least one tank. introduction of oxygen product.

13. The process of claim 8, wherein during an initial portion of the production sub-step, the oxygen product is sent to an auxiliary tank.

14. The process of claim 8, wherein during at least part of step b) the gas withdrawn countercurrent is vented to the atmosphere.

15. A process for the production of a product gas separated from a feed mixture by adsorption with transatmospheric pressure variation, in a unit comprising at least one pair of adsorbers, where there is carried out in each adsorber of the pair a cycle comprising the following successive steps:
   a1) countercurrent repressurization with gas from a first co-current depressurization in the other adsorber of the pair, and product gas from a non-segregated product gas tank;
   a2) co-current repressurization by the feed mixture, terminating by a sub-step of production in which product gas is withdrawn from the adsorber and sent to the non-segregated product gas tank;
   b) a first co-current decompression step with simultaneous counter-current and co-current withdrawal of gas from the adsorber, the gas withdrawn co-currently being sent directly to the other adsorber of the pair in the course cf step a1);
   c) a countercurrent purge step comprising a pumping to a low pressure of the cycle; and
   d) a purge/elution step with countercurrent introduction of product gas and simultaneous countercurrent pumping.

* * * * *